United States Patent [19]

Kitai et al.

[11] 4,258,988

[45] Mar. 31, 1981

[54] FOCUSING DEVICE FOR AUTOMATIC FOCUSING CAMERA

[75] Inventors: Kiyoshi Kitai; Tadashi Nakagawa; Hiroaki Ishida, all of Shikawatashi, Japan

[73] Assignee: Seiko Koki Kabushiki Kaisha, Tokyo, Japan

[21] Appl. No.: 17,938

[22] Filed: Mar. 6, 1979

[30] Foreign Application Priority Data

Mar. 7, 1978 [JP] Japan .................................. 53-25666

[51] Int. Cl.³ .......................... G03B 7/08; G01J 1/20
[52] U.S. Cl. ...................................... 354/25; 250/201
[58] Field of Search .................. 354/25, 195, 196–199; 250/204, 201; 352/140

[56] References Cited

U.S. PATENT DOCUMENTS

| 3,618,499 | 11/1971 | Harvey | 354/25 X |
| 4,075,639 | 2/1978 | Peterson | 354/25 |

Primary Examiner—L. T. Hix
Assistant Examiner—Thomas H. Tarcza
Attorney, Agent, or Firm—Robert E. Burns; Emmanuel J. Lobato; Bruce L. Adams

[57] ABSTRACT

An automatic lens focusing mechanism including a displaceable operating member, a focusing mechanism cooperative with the operating member for changing the focus of a lens as the operating member is displaced, and a mechanism comprising a control member displaced by the operating member as the operating member is displaced. An electromagnet is effective to hold an armature when it is energized. When the electromagnet is not energized the armature is mounted for sliding across a face of the electromagnet adjacent and parallel to the electromagnet face. A focus detecting mechanism energizes the electromagnet when the control member is at a position corresponding to a focused condition of the lens for holding the armature and the control member at a position corresponding to the focused condition to thereby hold the lens at the focused condition.

8 Claims, 3 Drawing Figures

U.S. Patent　　Mar. 31, 1981　　4,258,988
FIG. 1
FIG. 2
FIG. 3
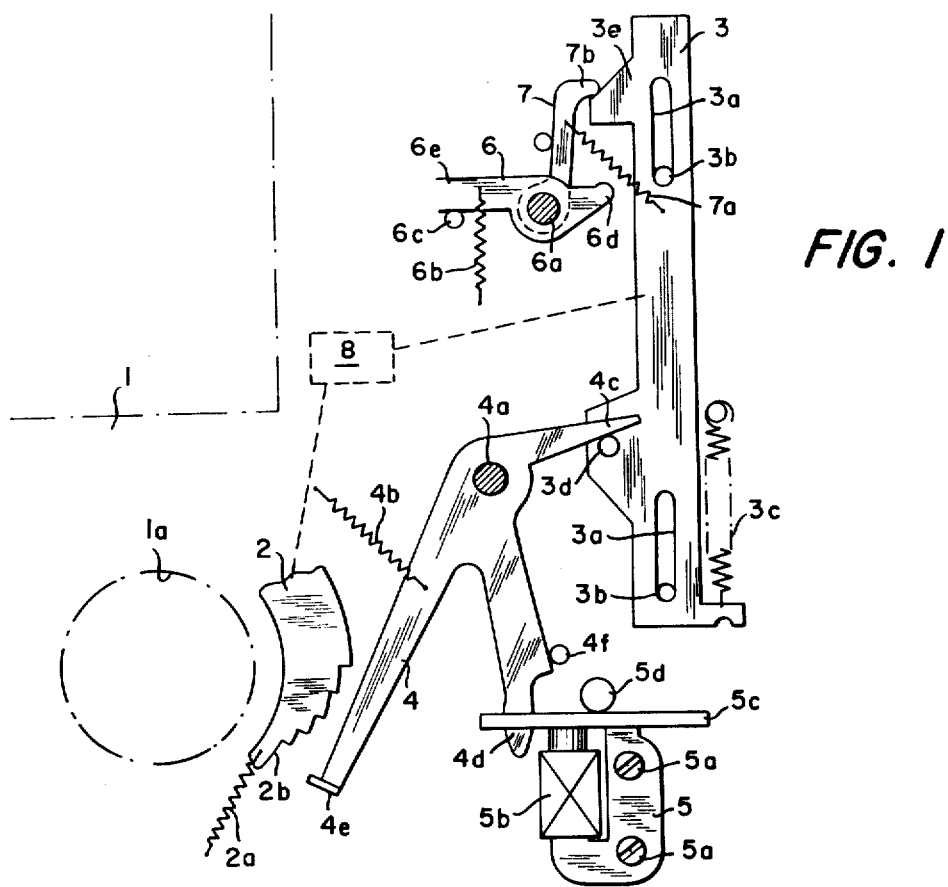
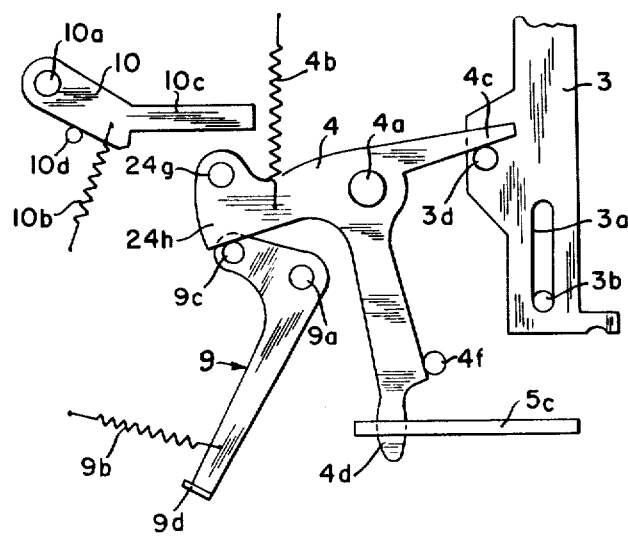
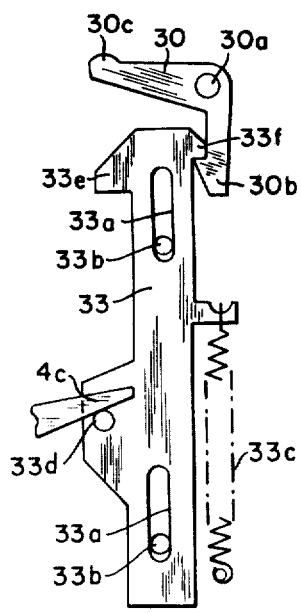

FOCUSING DEVICE FOR AUTOMATIC FOCUSING CAMERA

BACKGROUND OF THE INVENTION

This invention relates to a camera of the type in which focusing of the photographic lens is performed automatically.

There has already been provided a camera of the type which is capable of automatic focusing of the photographic lens by detecting object distance and generating an electric signal to cut off the electric current which is exciting an electromagnet used to displace the photographic lens, when the in-focus condition is detected.

It is the usual procedure for this type of camera that the automatic focusing electronic circuit is activated by closing a switch at the initial stage of shutter release operation to have the electromagnet excited and prepared for the focusing operation. Next the electromagnet is deenergized when a focus detection signal is generated. As a consequence, the battery is exhausted sooner due to extended excitation of the electromagnet. Furthermore, this type of camera has a disadvantage in that it requires a complex mechanism including a means for pushing the member which is actuated when the electromagnet is deenergized against the electromagnet so that it is difficult to reduce in size.

SUMMARY OF THE INVENTION

Accordingly, an object of the present invention is to provide an automatic focusing camera of a simple structure with less component parts and reduced dimensions, and also having a reduced battery consumption.

According to the present invention, an automatic focusing camera capable of automatic focusing of the photographic lens by detecting object distance is provided with an operating member, means for focus detection, a control member operated in connection with the operating member to stop the photographic lens at a focus matching position, and an electromagnet connected to the focus detecting means for detecting the focus matching position of the photographic lens. When the control member is shifted to a position corresponding to the focus matching position of the photographic lens interlocking with the operation of the operating member, the electromagnet attracts and holds the control member at the position corresponding to the focus matching position when a focus matching signal is given by the focus detecting means. The operating member may be adapted so as to be actuated in accordance with a shutter release operation or may be adapted so as to be released from detention in accordance with shutter release operation and to actuate the control member to perform focus detection while it is travelling.

BRIEF DESCRIPTION OF THE DRAWINGS

FIG. 1 is a schematic plan view of a first embodiment of the present invention in a charged state.

FIG. 2 is a schematic plan view of an essential part of a second embodiment of the present invention.

FIG. 3 is a schematic plan view of an essential part of a third embodiment of the present invention.

DESCRIPTION OF THE PREFERRED EMBODIMENTS

Referring first to FIG. 1, a base plate (1) has an aperture (1a) around which is rotatably fitted a cam ring (2) so as to be driven by a spring (2a). The cam ring (2) is coupled with the photographic lens and has a stopped cam part (2b) for adjusting the photographic lens to a focus matching position or in focus position.

An operating member (3) having a projecting pin (3d) protrusion (3e) and slots (3a) is slidably guided by pins (3b) fitted in the slots (3a) and is urged upwards by a spring (3c).

A control member (4), having an operating arm (4c), a retaining arm (4d) and a raised fixing end (4e), is rotatably fitted on a shaft (4a) and is urged clockwise by a spring (4b). The control member (4) is illustrated resting with the operating arm (4c) in contact with the pin (3d) while the retaining arm (4d) in contact with a fixed pin (4f).

An electromagnet (5) including a coil (5b) connected to an automatic focus detecting electronic circuit, not shown, is fixed on the base plate (1) by means of screws (5a). An armature plate (5c) of a magnetic material is disposed adjacently to the electromagnet (5) and is slidably guided between the electromagnet (5) and a fixed pin (5d). The end of the retaining arm (4d) is fitted in a slot provided on one end of the armature plate (5c).

An initiating lever (6), having an extension (6d) to be engaged with the protrusion (3e) of the operating member (3) and an arm (6e) for starting the shutter, is rotatably fitted on a shaft (6a) and is urged counterclockwise by a spring (6b). The initiating lever (6) is illustrated resting retained by a fixed pin (6c) at the arm (6e).

A detecting lever (7) is rotatably fitted on the shaft (6a) and is urged clockwise by a spring (7a) while it is constrained from rotating clockwise by the inclined edge of the protrusion (3e) against which the projecting part (7b) rests.

The cam ring (2) is interlocked with the operating member (3) by a known means (8) so as to be operated in accordance with the reciprocation of the operating member (3).

The manner of operation of the mechanism will be explained hereinafter. Starting from the charged state as illustrated in FIG. 1, the automatic focus detecting electronic circuit is connected to the power source by a known means, not shown, and is activated when the operating member (3) is depressed against the spring (3c), being guided by pins (3b), for focus detection, while the detecting lever (7) is allowed to turn clockwise about the shaft (6a) being pulled by the spring (7a) as the projecting part (7b) follows the inclined edge of the protrusion (3e).

At the same time, the control member (4) is allowed to be turned about the shaft (4a) by the spring (4b) as the operating arm (4c) follows the downward movement of the pin (3d) so that the retaining arm (4d) pulls the armature plate (5c) leftwards and the raised fixing end (4e) approaches the step cam part (2b).

The clockwise movement of the detecting lever (7) is converted by a known means into electric signals, such as electric resistance, electric capacitance or electric pulses, and when an electric signal, equivalent to the focus matching signal given by the automatic focus detecting electronic circuit, is given, a electric current is fed to the coil (5b) of the electromagnet to magnetize the electromagnet (5) so that the armature plate (5c) is attracted and fixed by the electromagnet (5). Consequently, the raised fixing end (4e) is retained at the position corresponding to the focus matching or in focus position of the photographic lens and prepared for engaging with a step cam of the step cam part (2b).

As the operating member (3) is depressed further, the cam ring (2) is allowed, through a known means (8), to be turned clockwise around the aperture (1a) being pulled by the spring (2a). The cam ring (2) is stopped when a step cam of the step cam part (2b) engages with the raised fixing end (4e) which has previously been retained at the position corresponding to the focus matching or in-focus postion of the photographic lens.

As the operating member (3) is depressed further, the protrusion (3e) pushes the extension (6d) exposure initiating lever (6) so that the exposure initiating lever (6) is turned clockwise about the shaft (6a) against the spring (6b) to actuate the shutter for exposure.

Although the electromagnet (5) is unmagnetized after one of the step cams of the cam part (2b) has engaged with the raised fixing end (4e) as the cam ring (2) is turned clockwise by the spring (2a), the photographic lens remains focused.

When the depression on the operating member (3) is terminated the operating member (3) is pulled upwards by the spring (3c), being guided by the pins (3b) to the charged position as illustrated in FIG. 1. During the upward travel of the operating member (3), the protrusion (3e) separates from the extension (6d), the pin (3d) pushes the operating arm (4c) to turn the control member (4) counterclockwise about the shaft (4a) against the spring (4b) so that the raised fixing end (4e) is disengaged from the step cam part (2b), the retaining arm (4d) pushes the armature plate (5c) rightwards between the fixed pin (5d) and the electromagnet (5), and the inclined edge of the protrusion (3e) pushes the projecting part (7b) to turn the detecting lever (7) counterclockwise about the shaft (6a) against the spring (7a). Thus, the mechanism is restored to the charged state as illustrated in FIG. 1.

The cam ring (2) also is restored to the starting position as illustrated in FIG. 1 through the means (8) in accordance with the return travel of the operating member (3) so that the photographic lens also is restored to the starting position. Thus, the series of steps comprising the exposure operation is completed.

FIG. 2 illustrates an essential part of a second embodiment according to the present invention wherein those parts equivalent to corresponding parts of the first embodiment are indicated a like reference numeral and explanation on those parts will be omitted to avoid duplication.

Referring to FIG. 2, the control member (4) does not have a raised fixing end, but is provided with a pin (24g) and a push arm (24h).

A fixing lever (9), having a pin (9c) engaged with the push arm (24h) and a raised fixing end (9d) which is to be engaged with the step cam part (2b), is rotatably fitted on a shaft (9a) being urged clockwise by a spring (9b) and is illustrated resting retained at the pin (9c) by the push arm (24h).

An actuating member (10), having an arm (10c) which is to be engaged with the pin (24g), is rotatably fitted on a shaft (10a), urged clockwise by a spring (10b) and is illustrated resting on a fixed pin (10d).

In explaining the operation of the second embodiment, explanation will be omitted of the operation of those parts equivalent to those of the first embodiment.

In operation, as the operating member (3) is depressed, the operating arm (4c) follows the downward movement of the pin (3d) so that the control member (4) is allowed to be turned clockwise about the shaft (4a) by the spring (4b), consequently, the push arm (24h) separates from the pin (9c) to allow the fixing lever (9) to be turned about the shaft (9a) by the spring (9b) so that the fixing raised end (9d) advances into the step cam part (2b) operating range. Then in the similar procedure to that of the first embodiment, the electromagnet (5) is magnetized to attract and fix the armature plate (5c) so that the control member (4) and the fixing lever (9) are fixed at the position corresponding to the focus matching position of the photographic lens and the photographic lens is adjusted to the focus matching position.

When the detection of the focus matching position is impossible or the focus detecting electronic circuit fails to function due to circuit failure or exhaution of the battery, the actuating member (10) works to adjust the photographic lens to the pan-focus position where the photographic lens is focused to the practically acceptable extent for general use. Detailed explanation on the function of the actuating member (10) will be omitted.

The device according to the present invention can be adapted so as to perform automatic focus detection when the electromagnet (5) is magnetized and then initiate or complete exposure operation when the electromagnet (5) is unmagnetized by interlocking the actuating member (10) the exposure operation of the shutter. In this case, the automatic focus detecting circuit and an exposure controlling electronic circuit are required to be constructed so as to control the electromagnet (5).

FIG. 3 illustrates an essential part of a third embodiment according to the present invention. Explanation on the third embodiment will be made in contrast with the first embodiment of FIG. 1.

An operating member (33), slots (33a), pins (33b), a pin (33d) and a protrusion (33e) of FIG. 3 correspond to (3), (3a), (3b), (3d) and (3e) of FIG. 1, respectively. The operating member (33) is urged downwards by a spring (33c) and is retained at the charged position by a hook (30b) of a detent (30) at the shoulder (33f).

The detent (30) having an arm (30c) is rotatably fitted on a shaft (30a) and is urged clockwise by a spring, not shown.

In operation, when the detent (30) is turned counterclockwise about the shaft (30a) against the spring by being pushed at the arm (30c) in accordance with shutter release operation, the retention at the shoulder (33f) by the hook (30b) is released so that the operating member (33) starts travelling downwards being guided by the pins (33b) fitted in the slots (33a) and pulled by the spring (33c). Then, in procedure similar to that of the first embodiment, the photographic lens is adjusted to the focus matching position and exposure operation of the shutter is performed, and thus, a series of photographing operation steps is completed.

In re-charging the device, the operating member (33) is raised against the spring (33c) as far as the charged position where the operating member (33) is retained by the hook (30b) of the detent (30) at the shoulder (33f).

It will be well understood that this invention provides an automatic focusing device of simple structure, of less trouble and of reduced dimensions for reduced manufacturing costs. Consumption of the battery is limited because the exciting coil (5b) of the electromagnet (5) is required to be excited only for a short period of time and the device requires no mechanism for pushing the armature plate against the electromagnet, while the device which is composed so as to determined the focus matching position of the photographic lens by unmagnetizing the electromagnet requires an extra mechanism.

We claim:

1. A focusing device, for an automatic focusing camera capable of automatic focusing of the photographic lens by detecting object distance, having an operating member, focus detecting means for focus detection, a control member operated in connection with said operating member to stop the photographic lens at a focus matching position, and an electromagnet connected to said focus detecting means for detecting the focus matching position of the photographic lens, characterized in that said control member is detained at the position corresponding to the focus matching position of the photographic lens by said electromagnet being energized by a signal given by said focus detecting means when said control member is shifted to the position corresponding to the focus matching position of the photographic lens, said electromagnet having an armature and a magnetically attractive face for attracting said armature, and said armature being connected to said control member and positioned to travel adjacent to and parallel to the magnetically attractive face of said electromagnet as said control member is displaced by said operating member, whereby energization of said electromagnet by said focus detecting means is effective to hold said armature in position and fix the in-focus position of said control member.

2. A focusing device as set forth in claim 1 wherein said operating member is interlocked with the release button of a camera.

3. A focusing device as set forth in claim 1 wherein the detention of said operating member is released in accordance with shutter release operation and said control member performs focus detection while said operating member is travelling.

4. An automatic lens focusing mechanism, comprising:
- an operating member displaceable from a first position to a second position;
- focusing means cooperative with said operating member for changing the focus of a lens as said operating member is displaced from the first position toward the second position;
- means comprising a control member displaced by said operating member as said operating member is displaced for holding the lens at a focus position determined by the position of said control member;
- an electromagnet having a face at which a magnetic force is developed when said electromagnet is energized;
- an armature positioned adjacent the face of said electromagnet, said armature connected to said control member for sliding across the face of said electromagnet as said control member is displaced, and said electromagnet being effective to hold said armature at a fixed position and thereby prevent said control member from being displaced further when said electromagnet is energized;
- means mounting said armature for slidable movement across and parallel to the face of said electromagnet; and
- focus detecting means for energizing said electromagnet when said control member is at a position corresponding to a focused condition of the lens for holding said armature and said control member at the position corresponding to the focused condition to thereby hold the lens at the focused condition.

5. An automatic lens focusing mechanism as set forth in claim 4, wherein: said armature has a slot therethrough; and said control member is a lever mounted for pivotal movement and having a first arm engaged with said operating member to pivot said control member as said operating member travels from the first toward the second position, a second arm having an end portion inserted in the slot through said armature for sliding said armature across the face of said electromagnet as said control member pivots, and a third arm displaced as said control member pivots and having means for engaging said focusing means to hold the lens in a focus condition determined by the position of said third arm.

6. An automatic lens focusing mechanism as set forth in claim 5, wherein: said focusing means includes a cam ring which rotates with changes of lens focus and which has a radially stepped peripheral edge portion opposite said third arm of said control member; and said means for engaging of said third arm is comprised of an end portion of said third arm positioned for engaging said stepped edge portion of said cam ring to hold the lens in a focus condition determined by the position of said third arm.

7. An automatic lens focusing mechanism as set forth in claim 4, wherein: said armature has a slot therethrough; said control member is a lever mounted for pivotal movement and having a first arm engaged with said operating member to pivot said control member as said operating member travels from the first toward the second position, a second arm having an end portion inserted in the slot through said armature for sliding said armature across the face of said electromagnet as said control member pivots, and a third arm; and said means comprising said control lever further comprises a second lever mounted for pivotal movement and having a first arm including means for engaging said focusing means to hold the lens in a focus condition determined by the position of said first arm of said second lever and a second arm engaged with said third arm of said control member for limiting the position to which said first arm of said second lever can pivot according to the position of said third arm, and biasing means for biasing said second lever to pivot in a direction to advance said first arm of said second lever toward said focusing means.

8. An automatic lens focusing mechanism as set forth in claim 7, wherein: said focusing means includes a cam ring which rotates with changes of lens focus and which has a radially stepped peripheral edge portion opposite said first arm of said second lever; and said means for engaging of said first arm of said second lever is comprised of an end portion of said first arm of said second lever for engaging said stepped edge portion of said cam ring to hold the lens in a focus condition determined by the position of said third arm of said first lever and said first arm of said second lever.

* * * * *